Patented Aug. 27, 1929.

1,726,067

UNITED STATES PATENT OFFICE.

HORACE T. HERRICK AND ORVILLE E. MAY, OF WASHINGTON, DISTRICT OF COLUMBIA, ASSIGNORS TO THE GOVERNMENT AND THE PEOPLE OF THE UNITED STATES OF AMERICA.

PROCESS FOR THE MANUFACTURE OF GLUCONIC ACID.

No Drawing.   Application filed July 28, 1927.   Serial No. 209,192.

(GRANTED UNDER THE ACT OF MARCH 3, 1883, 22 STAT. L., 625.)

This application is made under the act of March 3, 1883, chapter 143 (22 Stat. 625) and the invention herein described and claimed may be used by the Government of the United States or any of its officers or employees in the prosecution of work for the Government, or by any citizen of the United States, without payment to us of any royalty thereon.

The preparation of gluconic acid from sugars and starchy substances has been previously described in the literature covering the production of such acids as citric, oxalic, acetic, succinic, malic, and gluconic, by the action of such fungi as *A. niger*, *A. glaucus*, *A. fuccus*, *C. glaber*, and *P. arenarium*. Most of the acids mentioned have been produced either individually or as mixtures, with the exception of gluconic acid. We have found that gluconic acid may be produced in good yields and without the contamination of appreciable amounts of other organic acids by the action of certain fungi of the Penicillium group as hereinafter described.

An aqueous solution of glucose or sucrose in varying strengths or an aqueous suspension of starch is made up and to this are added certain nutrient salts consisting of various combinations of the nitrates, chlorides, sulphates and phosphates of ammonium, potassium, sodium, magnesium and other metals of the alkaline and alkaline earth groups. After sterilization these solutions are cooled and inoculated with spores of the fungus to be used. This fungus may be a member of the *P. citrinum*, *P. divaricatum*, and *P. luteum purpurogenum* groups. The fungus is then allowed to grow on or in the solution. The process is completed in from 12 to 30 days, more or less, depending upon the variety of fungus and the concentration of sugar or starchy material. One or more further fermentations may be carried out with the same mycelium, without the use of nutrient salts, by withdrawing the fermented liquor from beneath the mycelium and replacing it with a fresh solution or suspension of sugar or starchy material. The acid may be recovered by concentration of the solution after filtration, or by neutralization with calcium carbonate and subsequent evaporation, or by the precipitation of calcium gluconate by the addition of alcohol.

The process described gives very good yields and the gluconic acid is obtained uncontaminated with appreciable amounts of organic acids.

Example I.

Volume of solution _____ 1 liter.
Fungus employed _ *P. luteum purpurogenum*.
Time _____ 14 days.
Commercial glucose _____ 200 grams.
$NaNO_3$ _____ 1.0 grams.
$MgSO_4 \cdot 7H_2O$ _____ 0.5 grams.
KCl _____ 0.1 grams.
$K_2HPO_4$ _____ 0.1 grams.
Acid recovered as calcium gluconate _____ 132 grams.

Example II.

This example illustrates the ability of the fungus mycelium to ferment a second batch of sugar solution after the first fermentation is completed. No nutrient salts are required.

Volume of solution _____ 850 cm.³
Fungus employed _ *P. luteum purpurogenum*.
Time _____ 7 days.
Commercial glucose _____ 160 grams.
Acid recovered as calcium gluconate _____ 146 grams.

What we claim is:

1. A process for the production of gluconic acid which includes the inoculation with spores and mycelium of one of the fungi from the group consisting of *P. citrinum*, *P. divaricatum* and *P. luteum purpurogenum* of an aqueous solution or suspension of carbohydrate material.

2. A process for the production of gluconic acid which includes the inoculation with spores and mycelium of one of the fungi from the group consisting of *P. citrinum*, *P. divaricatum* and *P. luteum purpurogenum* of an aqueous solution or suspension of carbohydrate material, in the presence of nutrient salts.

3. A process for the manufacture of gluconic acid which includes the fermentation of an aqueous solution or suspension of glucose with spores and mycelium of one of the fungi from the group consisting of *P. citrinum*, *P. divaricatum* and *P. luteum purpurogenum*.

4. A process for the manufacture of gluconic acid which includes the fermentation of an aqueous solution or suspension of glucose with spores and mycelium of one of the fungi from the group consisting of *P. citrinum*, *P. divaricatum* and *P. luteum purpurogenum*, in the presence of nutrient salts.

HORACE T. HERRICK.
ORVILLE E. MAY.